(12) United States Patent
Cunningham et al.

(10) Patent No.: US 12,184,737 B2
(45) Date of Patent: *Dec. 31, 2024

(54) MINIMIZING CONNECTION DELAY FOR A DATA SESSION

(71) Applicant: Connectify, Inc., Philadelphia, PA (US)

(72) Inventors: Kevin Cunningham, Swarthmore, PA (US); Alexander Gizis, Philadelphia, PA (US); Brian Prodoehl, Plymouth Meeting, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,258

(22) Filed: Jun. 10, 2023

(65) Prior Publication Data
US 2023/0319148 A1    Oct. 5, 2023

Related U.S. Application Data

(63) Continuation of application No. 17/589,862, filed on Jan. 31, 2022, now Pat. No. 11,716,395.

(60) Provisional application No. 63/143,427, filed on Jan. 29, 2021.

(51) Int. Cl.
*H04L 67/145* (2022.01)
*H04L 9/40* (2022.01)

(52) U.S. Cl.
CPC ........ *H04L 67/145* (2013.01); *H04L 63/0435* (2013.01); *H04L 63/061* (2013.01); *H04L 63/0807* (2013.01)

(58) Field of Classification Search
None
See application file for complete search history.

(56) References Cited

U.S. PATENT DOCUMENTS

| | | | | |
|---|---|---|---|---|
| 6,775,298 | B1* | 8/2004 | Aggarwal | H04L 67/02 370/473 |
| 8,990,901 | B2* | 3/2015 | Aravindakshan | H04L 63/101 726/4 |
| 8,996,873 | B1* | 3/2015 | Pahl | H04L 67/01 713/168 |
| 9,043,391 | B2* | 5/2015 | Husain | H04L 67/34 709/203 |
| 2009/0239549 | A1* | 9/2009 | Grigsby | H04W 4/029 455/456.1 |
| 2013/0047203 | A1* | 2/2013 | Radhakrishnan | G06F 21/577 726/1 |
| 2013/0227668 | A1 | 8/2013 | Mocanu | |
| 2014/0119221 | A1 | 5/2014 | Park et al. | |
| 2014/0122730 | A1 | 5/2014 | Burch et al. | |

(Continued)

*Primary Examiner* — Mohamed Ibrahim
(74) *Attorney, Agent, or Firm* — Kamran Emdadi

(57) ABSTRACT

One example may include identifying a communication session between a client device and a virtual private network (VPN) server has paused based on inactivity criteria, releasing communication session resources used by the communication session to a session resource pool, receiving a message at the VPN server from the client device indicating previously used session information, and re-establishing the communication session and resuming session data transfers between the client device and the VPN server using one or more of the communication session resources from the resource pool.

17 Claims, 6 Drawing Sheets

(56) References Cited

U.S. PATENT DOCUMENTS

2016/0301720 A1 10/2016 Khawam et al.
2021/0168662 A1 6/2021 Dowlatkhah et al.

* cited by examiner

MINIMIZING CONNECTION DELAY FOR A DATA SESSION

TECHNICAL FIELD

This application relates to minimizing connection delay, and more specifically to establishing a data session with minimal delay.

BACKGROUND

Conventionally, mobile devices and/or computer devices ('client devices') establish a communication session to receive consistent data exchanges with low latency and high reliability. When such connections are dormant or are not actively exchanging data between the client devices and the corresponding network, the session may be suspended or temporarily closed to release dedicated resources which can be provided back to a resource pool and reallocated to other client devices. Maintaining fundamental session information during a suspended session may be optimal when attempting to re-establish the session at a later time.

SUMMARY

Example embodiments of the present application include a method that includes identifying a communication session between a client device and a virtual private network (VPN) server has paused based on inactivity criteria, releasing communication session resources used by the communication session to a session resource pool, receiving a message at the VPN server from the client device indicating previously used session information, and re-establishing the communication session and resuming session data transfers between the client device and the VPN server using one or more of the communication session resources from the resource pool.

Another example embodiment includes a server that includes a processor configured to identify a paused active communication session between a client device and the server, release communication session resources dedicated to the communication session to a session resource pool, and re-establish the active communication session responsive to receiving a message from the client device comprising one or more previously used session re-establishment parameters, and the paused active communication session is re-established when the message is identified as including a session credential necessary to authenticate the client device.

Another example embodiment may include a non-transitory computer readable storage medium configured to store instructions that when executed cause a processor to perform identifying a paused active communication session between a client device and a server, releasing communication session resources dedicated to the communication session to a session resource pool, and re-establishing the active communication session responsive to receiving a message from the client device comprising one or more previously used session re-establishment parameters, and the paused active communication session is re-established when the message is identified as including a session credential necessary to authenticate the client device.

DETAILED DESCRIPTION

Figure 1A:
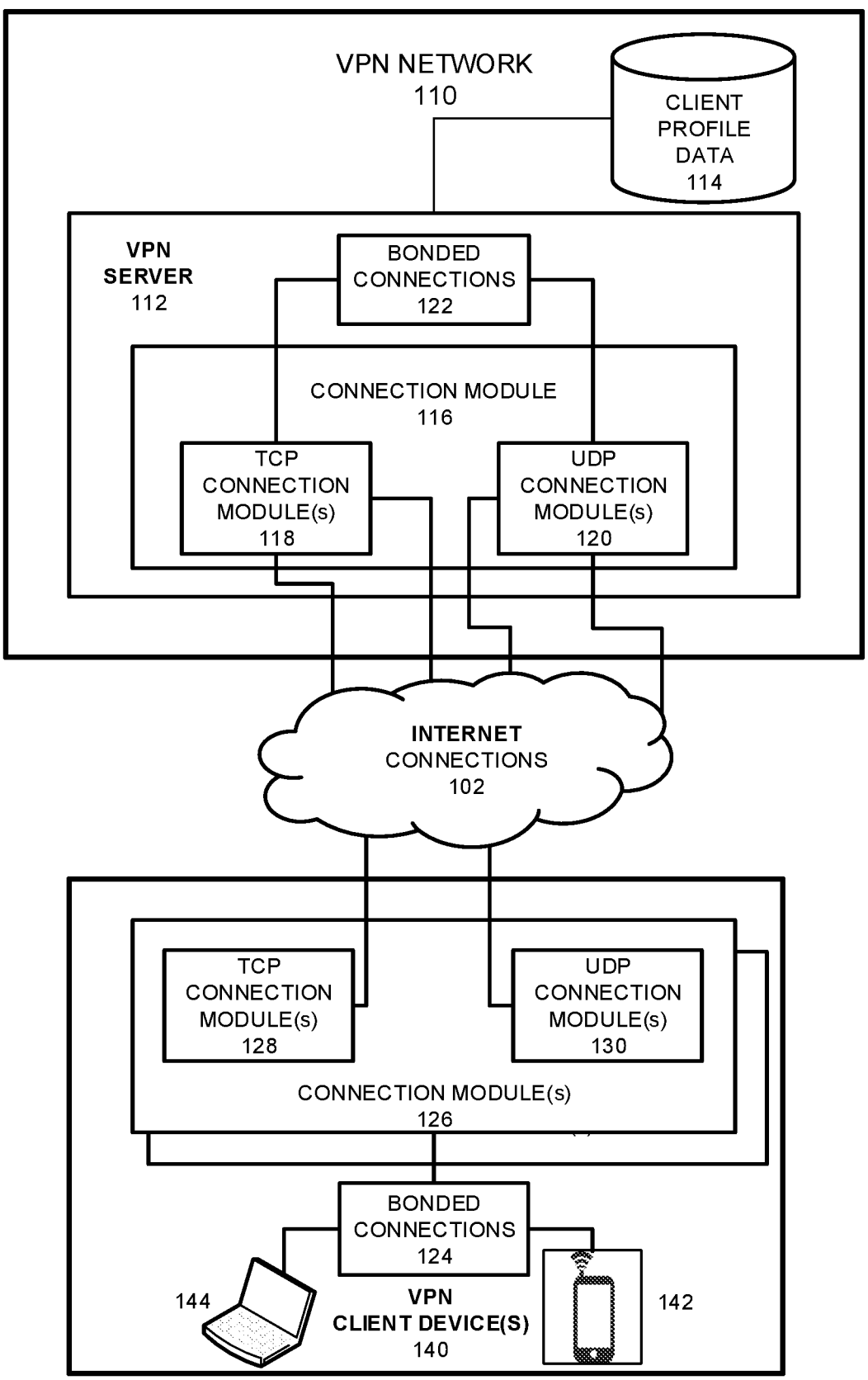
FIG. 1A illustrates an example data session network configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide network connection optimization for an application server providing data network access through communication channels to one or more client devices. Data communication protocols may include one or more of a transmission control protocol (TCP) and/or a user datagram protocol (UDP). Also, the TCP/IP protocol suite enables the determination of how a specific device should be connected to the Internet and how data can be exchanged by enabling a virtual network when multiple networks devices are connected. TCP/IP stands for transmission control protocol/Internet protocol and it is specifically designed as a model to offer reliable data byte streams over various interconnected data network.

UDP is a datagram/packet oriented protocol used for broadcast and multicast types of network transmissions. The UDP protocol works almost similar to TCP, but with some of the error-checking criteria removed which reduces the amount of back-and-forth communication and deliverability requirements.

TCP is a connection-oriented protocol and UDP is a connectionless protocol. The speeds associated with TCP are slower while the speed of UDP are generally faster within the network. TCP uses a 'handshake' protocol such as 'SYN', 'SYN-ACK', 'ACK', etc., while UDP uses no handshake protocols. TCP performs error checking and error recovery, and UDP performs error checking, but discards erroneous packets. TCP employs acknowledgment segments, but UDP does not have any acknowledgment segment.

A TCP connection is established with a three-way handshake, which is a process of initiating and acknowledging a connection. Once the connection is established, data transfer begins and when the transmission process is finished the connection is terminated by the closing of an established virtual circuit. UDP uses a simple transmission approach without implied hand-shaking requirements for ordering, reliability, or data integrity. UDP also disregards error checking and correction efforts to avoid the overhead of such processing efforts at the network interface level, and is also compatible with packet broadcasts and multicasting.

TCP reads data as streams of bytes, and the message is transmitted to segment boundaries. UDP messages contain packets that were sent one by one. It also checks for integrity at the arrival time. TCP messages move across the Internet from one computer to another. It is not connection-based, so one program can send lots of packets to another. TCP rearranges data packets in a specific order. UDP protocol has no fixed order because all the packets are independent of each other. The speed for TCP is slower and UDP is faster since error recovery is omitted from UDP. The header sizes are 20 bytes and 8 bytes for TCP and UDP, respectively.

In general, TCP requires three packets to set up a socket connection before any user data can be sent. UDP does not require three packets for socket setup. TCP performs error checking and also error recovery and UDP performs error checking, but discards erroneous packets. TCP is reliable as it guarantees delivery of data to the destination router. The delivery of data to the destination is not guaranteed by UDP. UDP is ideal to use with multimedia like voice over IP (VoIP) since minimizing delays is critical. TCP sockets should be used when both the client and the server independently send packets and an occasional delay is acceptable. UDP should be used if both the client and the server separately send packets, and an occasional delay is not acceptable.

FIG. 1A illustrates an example data session network configuration according to example embodiments. Referring to FIG. 1A, the configuration 100 may include a virtual private network (VPN) 110 which includes one or more VPN servers 112 and data storage, which in this case is used for storing client profile data 114 associated with one or more new or old client communication sessions. The communication sessions may include multiple network channels, generally, UDP and TCP are used for such sessions, however, other protocols used across the Internet 102 may also be used, such as HTTPS. The channels may be bonded together to create a single virtual channel for communication as shown from the bonded connections module 122 for the VPN server 112 and the bonded connections module 124 of the client device 140. In general, the VPN 112 may include UDP module(s) 120 and a TCP module(s) 118 as part of a connection module 116 to manage the connection process and a bonded connections module 122 to manage the various channels and the bonding of information among the channels.

The client side may include one or more client devices 140 such as a smartphone 142, cell phone, tablet, laptop 144, etc. Any one of those individual devices may be the 'client device' 140 at any particular time for a particular session. The client side may have an installed agent software application that communicates with the cloud servers of the VPN network 110. The communications are established and maintained across the Internet 102. The client side may also have its own bonded connections module 124 which manages one or more TCP/UDP connections associated with TCP/UDP connection modules 128/130, each of which may have multiple modules to accommodate multiple session, as part of the connection module(s) 126 of the client side. The module 126 may be multiple modules which are used for multiple respective sessions with various end user devices 140.

Figure 1B:
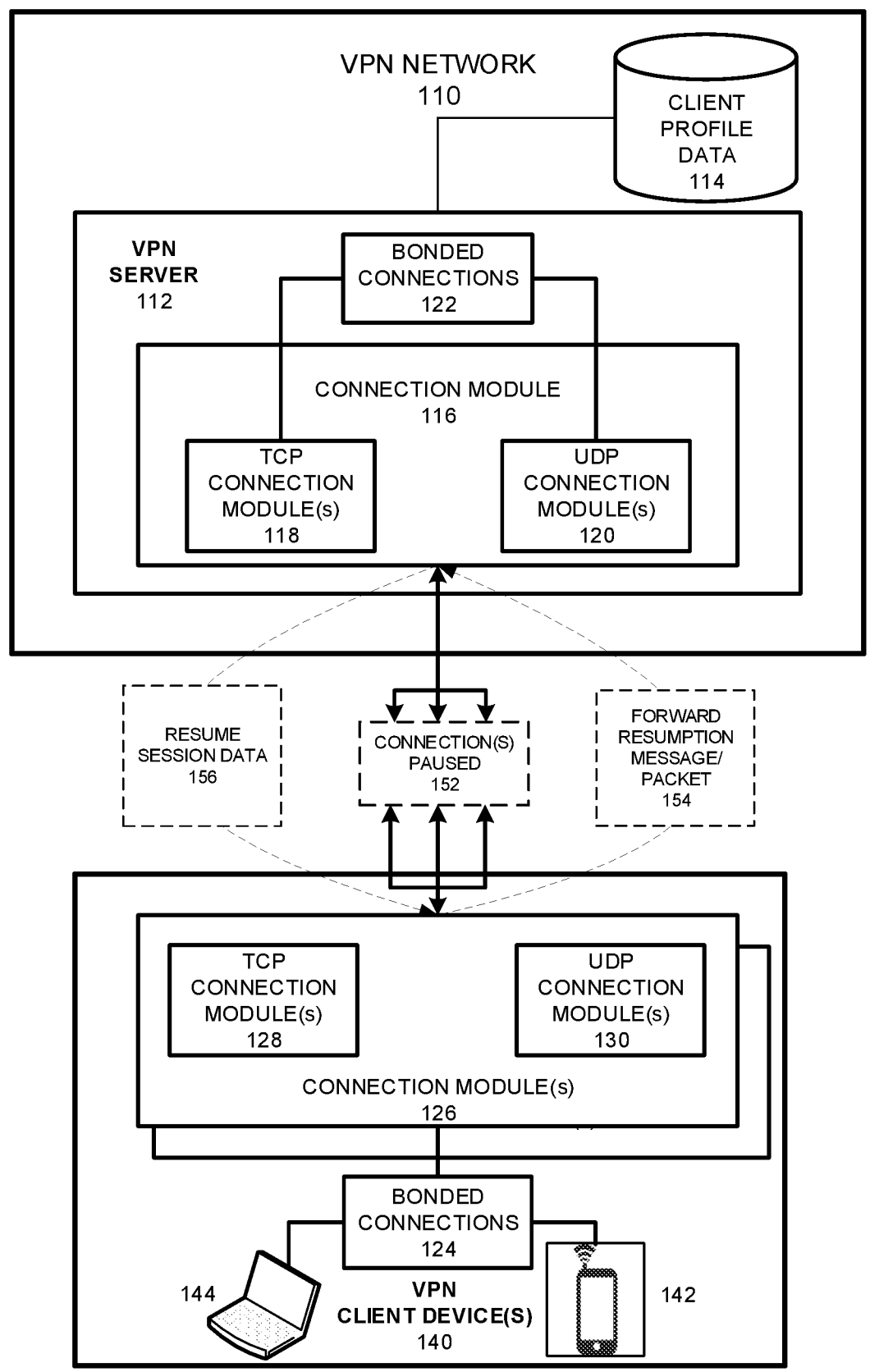
FIG. 1B illustrates an example data session network configuration during a paused session according to example embodiments.

FIG. 1B illustrates an example data session network configuration during a paused session according to example embodiments. Referring to FIG. 1B, the configuration 150 includes one or more client devices, such as client device 142, which may have an active session with the VPN network server 112 in order to share real-time conferencing data, voice, etc. However, the connections may pause 152, for example, during a time-out window of inactivity (e.g., 30 seconds, 60 seconds, etc.) or via other timing criteria or inactivity criteria used to identify that the resources allocated to the session are not being utilized at the current time. When the connection is paused, certain session information may be stored in the client profile data 114, such as the profile name, hardware address information of a client computing device(s), allocated ports, IP addresses, device type, protocols used, encryption keys which are negotiated and implemented during the previous session, etc.

In the event that the session is about to be resumed, in order to reduce network traffic, increase resumption time and limit resource allocation, a single message may be sent 154 to the connection module(s) 116 and to include certain session information which can quickly resolve the re-establishment process between the client devices and the server and reduce the number of back and forth communications, or, round or trip times (RTTs) to achieve the resumption. For example, the session may already have all the information stored and may only require an authentication token from the client device 140 and/or an encryption key which was previously used and can be readily matched to the stored information 114. The connection module 116 may then re-establish the paused connection and resume the session data 156.

Example embodiments provide maintaining a transport connection to a server while letting a virtual private network (VPN) connection for a calling device disconnect when the calling device is idle, for example, for a period of time (e.g., ($T_{th}$) threshold period of time), and then resuming and/or reconnecting the connection once the device re-enables for subsequent communications.

The amount of time necessary to re-establish a data connection that is otherwise used for time sensitive data exchanges (e.g., live two-way data sharing, voice communications, etc.), is critical to the user satisfaction of the application. Adding a second or two between when the application initiates a resume operation and when the network data begins to transfer/exchange between network devices (e.g., client device and server) may not be acceptable in certain circumstances.

The majority of delays experienced during data connection establishment/re-establishment scenarios are due to the number of round trips required to secure one or more of a socket connection, a data session establishment, etc., which may use ping messages exchanged at the appropriate times, and/or an encryption session. For example, in TCP based connections, the socket is usually requires one round trip time 1-RTT, a ping message, which may be used in some example protocols, is 1-RTT and the encryption session is 2-RTT. The UDP based connections are zero for the socket connection, but the other two are the same as TCP. Any pause in service whether intentional or non-intentional will invoke the required amount of RTTs in order to re-establish/resume a data session. During an encrypted session, there first is a 'hello' communication between the client and the server which takes one RTT, followed by the key exchange and session configuration which takes another RTT. Other message formats may also be used.

In one example, data session resumption can be optimized from a time saving and number of RTTs perspective by preserving known information, sharing certain contextual information and performing other actions which may effectively limit or eliminate the amount of back and forth communications. By maintaining certain security context information on the client and/or server, the client can close all of its active transport sockets when there is no application traffic for a certain period of time (e.g., minutes, hours, etc.) and as soon as there is new application traffic to send, a single application packet can be populated with enough contextual information to resume the session. This may include encrypted data with forward secrecy. By relying on the encryption to verify the client and server identity, then some layers of complexity in the code can be removed which may reduce the total number of RTTs between client device and server.

Another approach may be performed exclusively or with the other approaches is to share encryption keys across connections on different networks and use session resumption. This may reduce the total RTTs by at least one with regard to encryption establishment between server and client devices which normally requires more than one RTT. Example embodiments may use transport layer security protocol (TLS) on the TCP connections. Also, providing an encryption key rotation after some amount of data is sent and using a separate key exchange procedure.

In the example of a UDP transport scenario, a session resumption may include forwarding session resumption information and real data in a first packet sent across the network from the client device (previously active in the session). TCP still requires at least 1 RTT for the SYN/SYN ACK, before data can be exchanged, however, UDP does not have that RTT requirement, and so a single packet sent with no feedback required would effectively be a 0 RTT scenario to resume a session between client and server. By enabling the allow server sessions to be closed down when the client is not present on the session/data connection, and having a component that will permit clients to start sending data immediately when the session is re-established/resumed, the data session resources are effectively available all the time to any resources and the user experience remains optimal throughout the active/inactive session scenarios.

After performing the reduced data session resumption procedures, UDP could have a 0-RTT socket connection setup, a 0-RTT ping setup, a 0-RTT encryption session in the case of a datagram transport layer security (DTLS) protocol, such as version 1.3 or a 1-RTT encryption session in the case of DTLS 1.2. TCP could have a 1-RTT socket connection setup, a 0-RTT ping setup, a 0-RTT encryption session in the case of DTLS 1.3 or a 1-RTT encryption session in the case of DTLS 1.2.

TLS and DTLS 1.2 and earlier related protocols use a 2-RTT handshake. With TLS 1.3 0-RTT may be achieved and combined with a session resumption. The initial communication establishment can still take 2-RTTs, but after that, the session can be resumed with 0 RTTs. DTLS 1.3 will include the same session resumption ability, but DTLS 1.3 is still under development. In example embodiments, DTLS is used for transport connections. It would be possible to use TLS for TCP based transport connections in place of DTLS for all transport types. TLS requires everything to be delivered reliably in order, while DTLS supports lost and out of order packets.

Each VPN session may utilize its own container on the server. Leaving that container operating (or claimed in the case of pre-allocated containers), which indicates that the server is devoting resources to that VPN session. If the client device is dormant and not sending any traffic at the current time, then the server is still utilizing resources for that inactive client device, which could be allocated to another client device. By enabling the capability to quickly resume the VPN session, the server can free-up resources from the idle sessions and then recreate the session when the client device becomes active and initiates data traffic again.

During a session setup, TCP may be considered more reliable than UDP, however, example embodiments for data session management may utilize both protocols simultaneously for initial session establishment. In most cases, the UDP connection will probably establish first before TCP or other protocols since it does not have the additional socket RTT requirement. Once all connections are established in a session, then the application may determine which is best for sending data at that time. For cases where a quick session resumption is being performed, the UDP protocol is likely to be used for the session resumption since it avoids extra round trips (RTTs). However, there are cases where UDP might not work because it is either blocked or throttled by the network. In those cases, both UDP and TCP may be candidate protocols for session establishment and/or session resumption.

Certain data structures may include a signed token that identifies the user. Also, an encryption key that is generated on a first connect, and which may be occasionally recreated. The client and server may both store the keys to permit a session to continue. The server may keep a structure of all the tokens recently used and the associated key that was used.

In general, a transport connection is a connection between the VPN client and the VPN server over a particular network and/or Internet connection using a particular protocol, such as TCP, UDP, HTTPS, or another protocol. The established connection is used to send encapsulated and/or encrypted application packets between the client and the server. In one example embodiment, multiple transports connections are created for each session over the available networks and protocols. Conventionally, a VPN will create one transport connection over one network with one protocol per session. For example, given two networks to utilize, the data connection optimization application may create three transport connections (e.g., TCP, UDP, and HTTPS) over each network, for a total of six transport connections. Other combinations of connection types, numbers of connections, etc., may also be utilized.

According to example embodiments, a separate encryption session may be established for each transport connection. While DTLS does support some amount of lost packets and out of order packets, a single DTLS session cannot handle the variability of packet delivery that comes with bonding multiple connections which might have different latencies. In order to obtain optimal channel bonding performance, separate sessions for each connection are required, which may include separate encryption sessions for each connection. The application may generate separate encryption keys for each of these sessions. However, reuse of the same key across all the encryption sessions may also be a possibility. By using the same encryption key across connections, the more time intensive 2-RTT session establishments may only be required over one network per session. Then, if the device later joins a second network, it could use session resumption to establish the connection more quickly. Session resumption can be applied to VPN sessions. The management server can reuse the virtual container for a VPN session when the previous session is deemed idle, and this permits resources to be reused. When the client device wants to resume its session, the server will have the necessary data that it needs to quickly resume that session for the client, without the client having to establish a completely new VPN session, which takes considerable time. Example embodiments provide for using TLS/DTLS in the context of quickly re-establishing VPN sessions, particularly over multiple networks. Also, permitting the server to re-allocate resources and then quickly resume a VPN session is also achievable.

Figure 2:
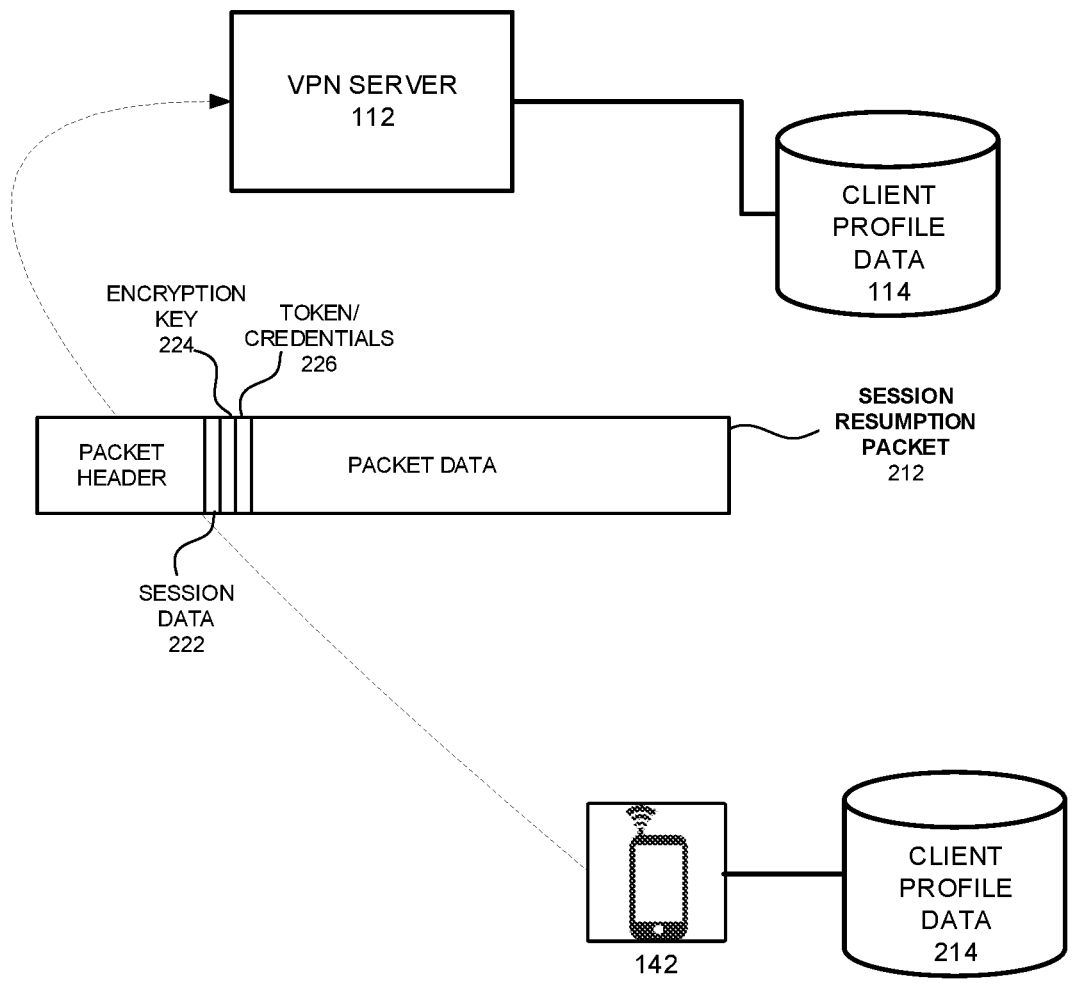
FIG. 2 illustrates a client device re-establishing a communication session via a single message according to example embodiments.

FIG. 2 illustrates a client device re-establishing a communication session via a single message according to example embodiments. Referring to FIG. 2, the example configuration 200 includes the client device 142 forwarding a single message, such as a resumption packet 212 to the VPN server 112 to restore a paused session. The packet may include certain resumption data, including but not limited to an encryption key 224, a token or other credentials 226 and/or other session data 222 that can be used to restore a session based on the previously used session information. The information necessary to cross-reference/compare to the received packet data in the resumption packet 212 may be stored in the server side memory 114 and/or in the client side memory 214. Such information 222-226 including credentials, such as encryption keys, tokens, username, passwords, etc., may be used to populate the single message packet 212 with information necessary to resume the communication session.

Figure 3:
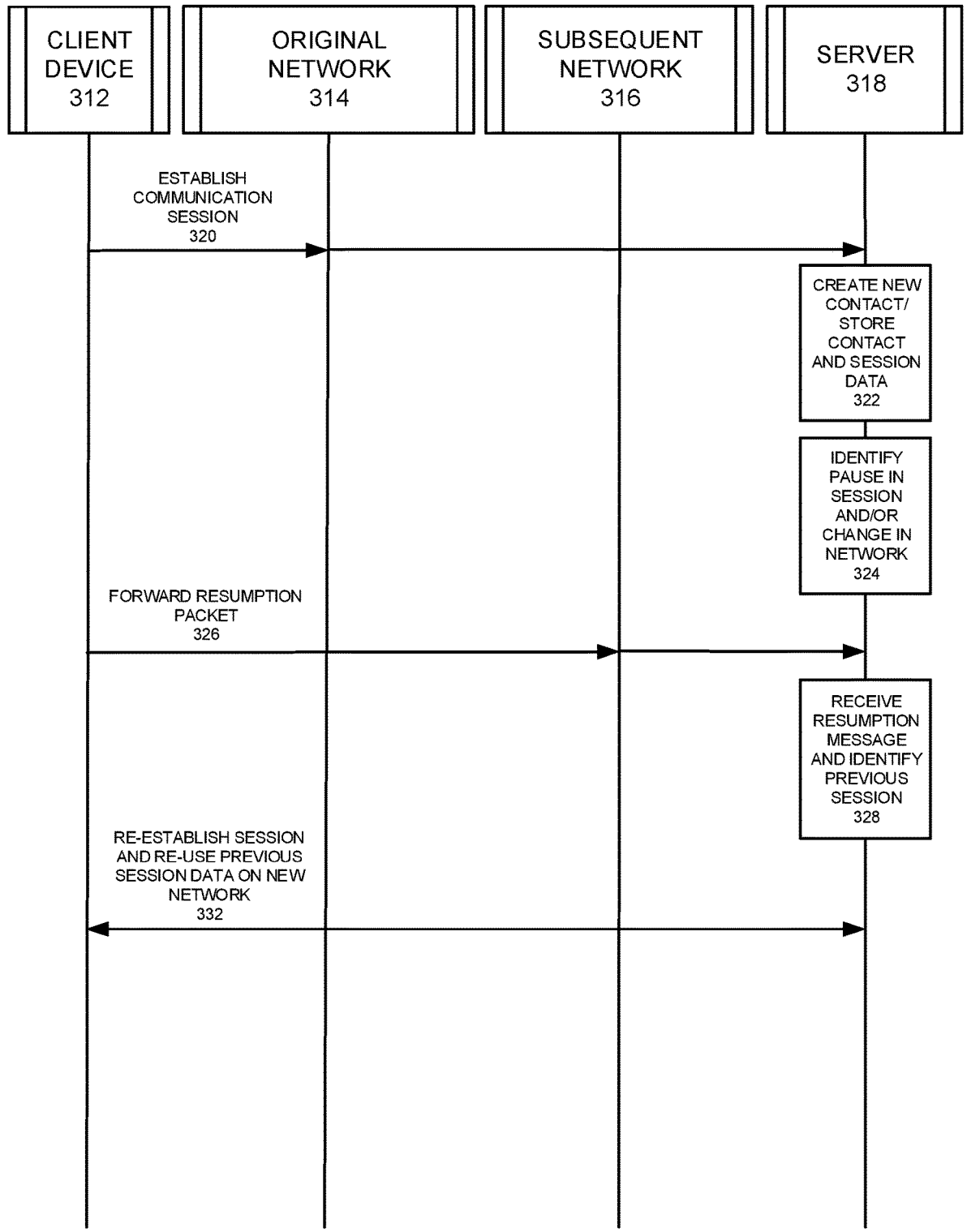
FIG. 3 illustrates an example system diagram of a communication flow between a client device and a server for a communication session according to example embodiments.

FIG. 3 illustrates an example system diagram of a communication flow between a client device and a server for a communication session according to example embodiments. Referring to FIG. 3, the system 300 includes a scenario where a client device 312 may be part of an active session with a server 318 via one or more different networks 314/316. In one example, the client device 312 may establish a communication session 320 with a server via a first network (original network) 314, such as a Wi-Fi network. The network 314 may maintain a connection with the server 318 for a communication session during which the server 318 may store the session data, session encryption keys and other relevant information 322. When idle session criteria is fulfilled (e.g., data transfer thresholds, time thresholds, etc.), the session may be identified as paused 324 and the session resources, such as dedicated bandwidth, IP addresses, ports, container resources, processes, etc., may be released back into a pool of resources utilized by the cloud virtual machines and/or other containers dedicated to network connection management. Thereafter, a resumption packet 326 may be sent when the client device is attempting to re-establish a connection. In this particular example, the client device 312 may have moved to a different network, such as from a Wi-Fi network to a new (subsequent) network, such as a cellular data network as the subsequent network 316 or may be another network (e.g., other Wi-Fi network). The network resources may have changed but the client device 312 and the server 318 may have remained the same so the resumption message 326 can re-establish a connection over the new network 316 using similar resources of a previous session 328, which may include an encryption key that was previously used and which does not require renegotiation via multiple RTTs. By utilizing recycled resources stored in memory, the client device 312 can re-establish its session 332 to the server 318 without back and forth communications.

When an initial connection is established and communication path is active between a client device and a server, such as a VPN server, a daemon process may be created to accommodate the data connection, this may include ports, IP addresses, device names, etc. When that initial process is paused, which may be the result of a timeout (e.g., a period of time a data transmission rate has been below a data per unit time threshold), an application triggering an end of use scenario, etc., then the connection may be closed and the resources may be released, however, the connection is considered paused since certain specific connection information will be used to re-establish the connection.

A pause in an active connection could include a reduction in the amount of data transferred across the communication channel of the connection for a particular amount of time, the client application deliberately pausing the session, or other pause triggers. Also, since the client device may be connecting to a VPN, the VPN client/agent operating on the client device could be dictating terms used to pause the connection, for example, if the client device is using the VPN for a specific application and that application is no longer being used, this could trigger a paused connection, like a conference call just ended. The VPN will manage specific types of traffic for a client device.

The client profile may be updated when a pause in a data connection occurs, when a connection is established, and in other scenarios, the profile is updated to include any new encryption key updates and the new key is stored in the profile, and this updating can occur at the end of an active session or as the pause to the session occurs. The session data, can include IP information, ports, names, device IDs, protocol information, versions of a protocol, application specific parameters, additional data associated with the client device and/or vendor information that identifies a particular vendor, such as an ISP or cellular data service. Tokens and credentials could include an encrypted web token, an API key used instead of a token, and may be pre-shared or pre-generated and used to authorize a client device connection for the initial connection and for subsequent connections. The same information can be identified and the token is sent along with any other original information, which may be encrypted using the previously assigned encryption key(s). In order to re-create the encrypted session, a token is used to authorize the client device by performing a verification process to re-create a session.

When the resumption packet is received a token is used to identify a profile, username, signed information, etc., which may all be encrypted. After the resumption packet is received, the client profile data is retrieved based on content of the packet. To re-establish a session certain saved data is retrieved and can be used to establish a session in a single resumption packet. In one example, a mobile device or client device may be using an application, and when the user sets the device down, the action of actively watching a video, browsing the web, using a news application, etc., the socket (s) that is created to accommodate that information (e.g., images, content feeds, words, advertisements, etc.) require session establishment and time. As the session is resumed and is not required to be re-established in its entirety since certain session data is preserved, the single resumption packet and no round trip time is needed to re-establish the connection, the user will be pleased to have the information reloaded faster and without any delays. However, if the credentials cannot be confirmed during an resumption effort, a failure may occur, the token may not be accurate or the amount of time may have exceeded the amount of time profiles are stored.

Figure 4:
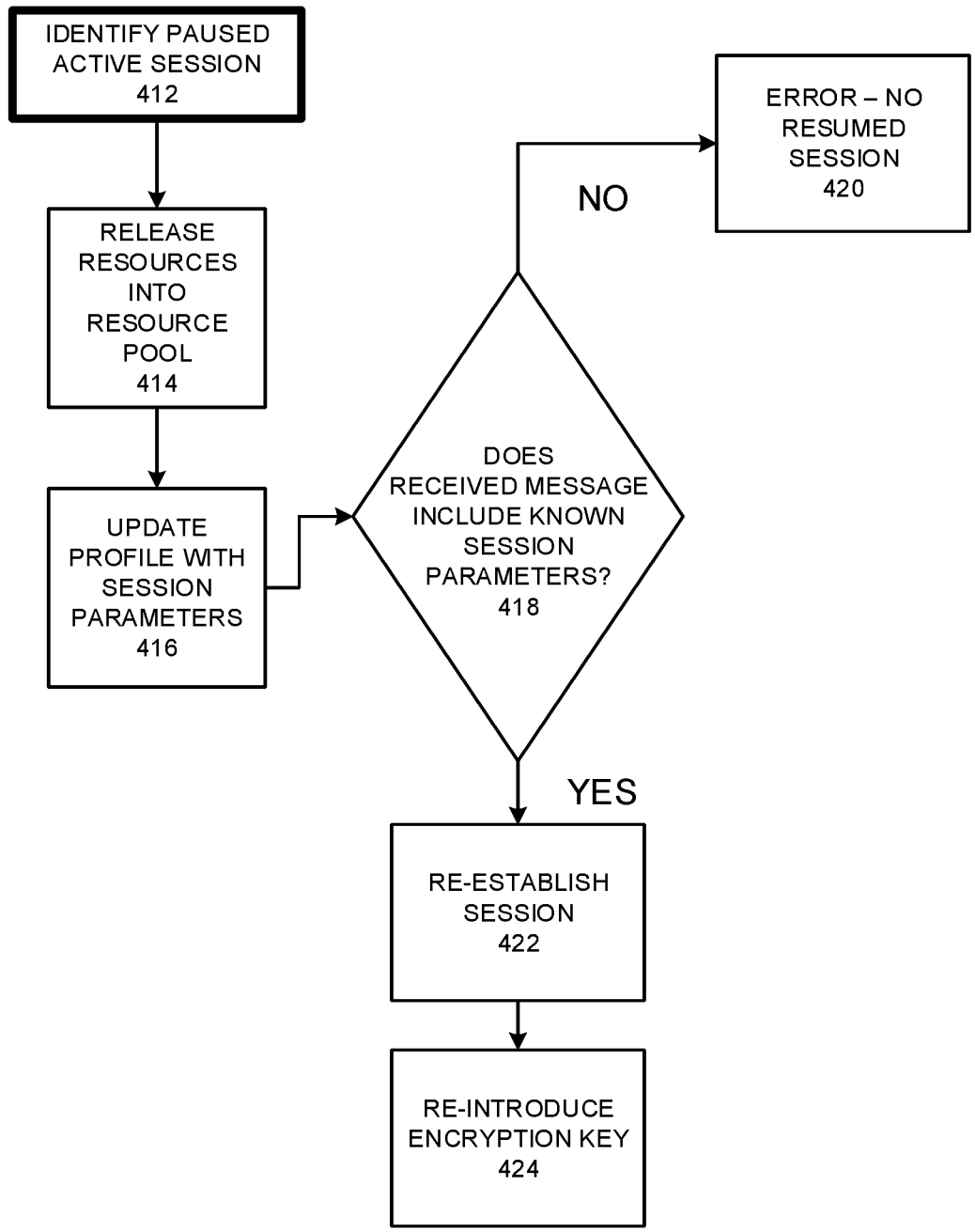
FIG. 4 illustrates a flow diagram of a process for pausing and re-establishing a communication session according to example embodiments.

FIG. 4 illustrates a flow diagram of a process for pausing and re-establishing a communication session according to example embodiments. Referring to FIG. 4, the process 400 may include identifying a paused active communication session 412 between a client device and a server, releasing communication session resources dedicated to the communication session to a session resource pool 414, and updating a profile 416 to reflect the session information in a data store. The process may also include re-establishing the active data session responsive to receiving a message from the client device with one or more session re-establishment parameters. The message may be identified for known session parameters 418, if none are found the session resumption may be cancelled 420. If the parameters match, the session can be re-established 422 and this may include re-using a previously known encryption key 424.

The message may be a single packet comprising one or more communication session re-establishment parameters which match one or more of the stored communication session parameters. Responsive to receiving the packet, the server may allocate session resources from another paused data session different from the paused data session, and populate a container or virtual machine with the data session parameters identified from the profile. During session establishment, the session may include establishing a UDP session between the client device and the server, and establishing a TCP session between the client device and the server after the UDP session is established as a second session.

Some of the communication session parameters include one or more of an active process, an allocated container, one or more IP addresses, and one or more ports. Also, the message may include an encryption key that was previously used during the communication session. The process may include pausing the active communication session between the client device and a server, responsive to receiving the message from the client device, re-establishing the active data session on a new channel based on a previously known encryption key associated with the client device, and encrypting subsequent communications based on the encryption key.

According to another example embodiment, a process may include pausing an active data session between a client device and a server, releasing session resources to a resource pool, and responsive to receiving a packet from the client device, re-establishing the active data session with new session resources from another paused session, based on one or more session allocation identifiers included in the packet which matches one or more session allocation identifiers stored in a session profile associated with the client device.

Example embodiments may be referred to with reference to one or more 'sessions'. The term session(s) may be a communication data link between a client and server based on one or multiple sessions. Each sessions may have additional sessions within itself, such as an encryption session being established within one communication channel session and additional encryption sessions being established on other communication channel sessions. The plurality of communication channels may be bonded into a single channel or session which is composed of multiple communication sessions and respective encryption sessions.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
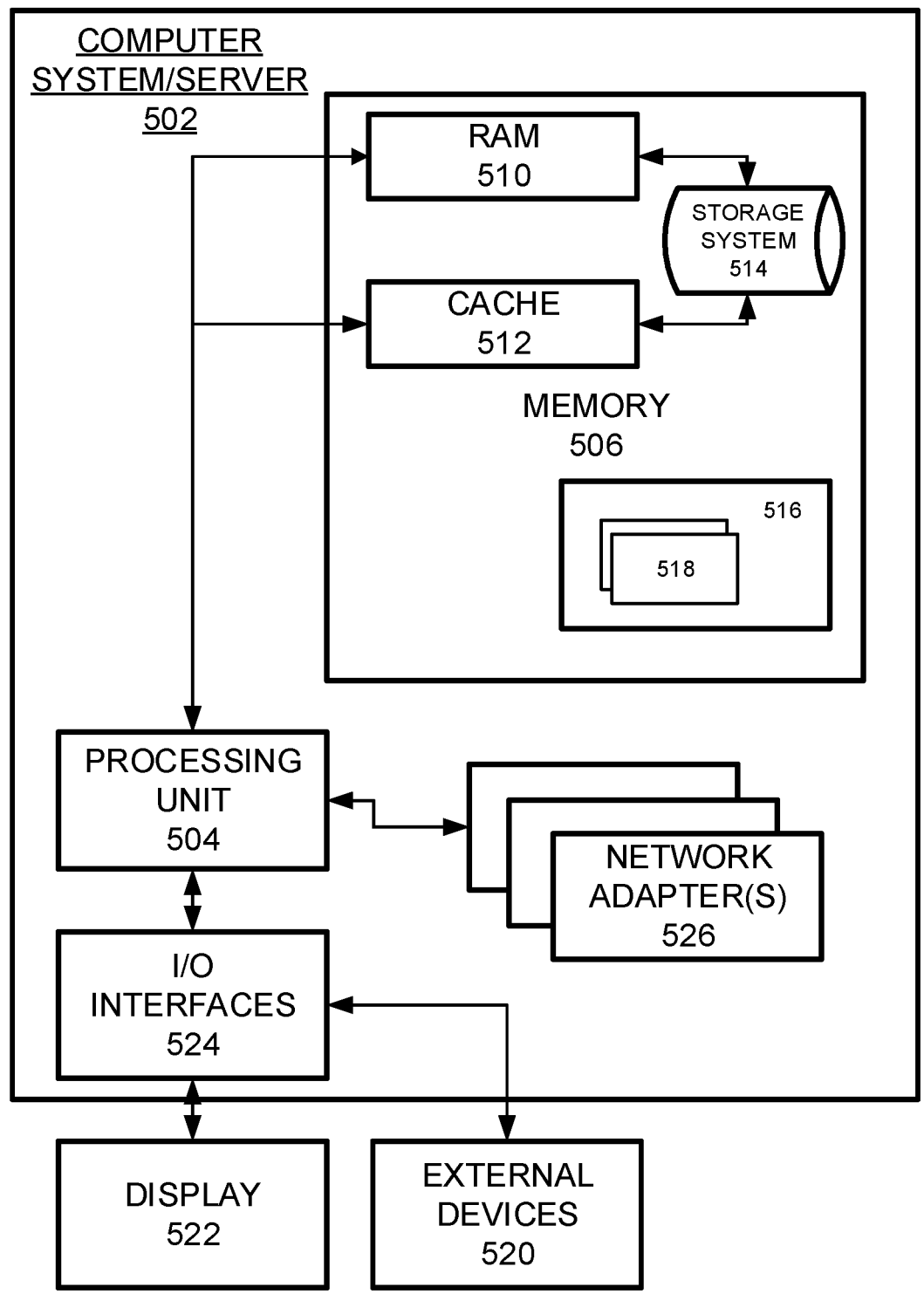
FIG. 5 illustrates an example network entity device configured to store instructions, software, and corresponding hardware for executing the same according to example embodiments.

FIG. 5 illustrates an example network entity device configured to store instructions, software, and corresponding hardware for executing the same according to example embodiments. FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 5, computer system/server 502 in cloud computing node 500 is displayed in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter(s) 526. As depicted, network adapter(s) 526 communicates with the other components of computer system/server 502 via a bus. It should be understood that although not displayed, other hardware and/or software components could be used in conjunction with computer system/server 502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
identifying a communication session between a client device and a virtual private network (VPN) server has paused based on inactivity criteria;
storing in memory one or more session parameters associated with the communication session;
releasing communication session resources used by the communication session to a session resource pool;
receiving a message at the VPN server from the client device indicating previously used session information, wherein the message comprises an encryption key and a token;
retrieving a client profile associated with the client device using the token; and
re-establishing the communication session between the client device and the VPN server using one or more of the communication session resources from the resource pool when the previously used session information matches the one or more session parameters stored in the client profile.

2. The method of claim 1, comprising
allocating one or more of the released communication session resources to another communication session between the VPN server and another client device while the communication session is inactive.

3. The method of claim 1, wherein the message is a single packet comprising the previously used session information.

4. The method of claim 1, comprising
updating a profile to include released communication session parameters necessary to re-establish the communication session; and
populating a container or virtual machine with the released communication session parameters identified from the profile.

5. The method of claim 1, comprising
establishing a UDP session between the client device and the server; and
establishing a TCP session between the client device and the server after the UDP session is established.

6. The method of claim 1, wherein the released communication session resources include one or more of an active process, an allocated container, one or more IP addresses, and one or more ports.

7. The method of claim 1, wherein the inactivity criteria comprises a timeout of an inactivity time window used to monitor activity of the communication session.

8. A virtual private network (VPN) server comprising a processor coupled to a memory configured to
identify a communication session between a client device and the VPN server has paused based on inactivity criteria;
store in the memory one or more session parameters associated with the communication session;
release communication session resources used by the communication session to a session resource pool;
receive a message from the client device indicating previously used session information, wherein the message comprises an encryption key and a token;
retrieve a client profile associated with the client device using the token; and
re-establish the communication session between the client device and the VPN server using one or more of the communication session resources from the resource pool when the previously used session information matches the one or more session parameters stored in the client profile.

9. The VPN server of claim 8, wherein the processor is further configured to allocate one or more of the released communication session resources to another communication session between the VPN server and another client device while the communication session is inactive.

10. The VPN server of claim 8, wherein the message is a single packet comprising the previously used session information.

11. The VPN server of claim 8, wherein the processor is further configured to update a profile to include released communication session parameters necessary to re-establish the communication session, and populate a container or virtual machine with the released communication session parameters identified from the profile.

12. The VPN server of claim 8, wherein the processor is further configured to establish a UDP session between the client device and the server, and establish a TCP session between the client device and the server after the UDP session is established.

13. The VPN server of claim 8, wherein the released communication session resources include one or more of an active process, an allocated container, one or more IP addresses, and one or more ports.

14. The VPN server of claim 8, wherein the inactivity criteria comprises a timeout of an inactivity time window used to monitor activity of the communication session.

15. A non-transitory computer readable storage medium configured to stores instructions that when executed cause a processor to perform:
identifying a communication session between a client device and a virtual private network (VPN) server has paused based on inactivity criteria;
storing in memory one or more session parameters associated with the communication session;
releasing communication session resources used by the communication session to a session resource pool;
receiving a message at the VPN server from the client device indicating previously used session information, wherein the message comprises an encryption key and a token;
retrieving a client profile associated with the client device using the token; and
re-establishing the communication session between the client device and the VPN server using one or more of the communication session resources from the resource pool when the previously used session information matches the one or more session parameters stored in the client profile.

16. The non-transitory computer readable storage medium of claim 15, wherein the processor is further configured to perform allocating one or more of the released communication session resources to another communication session between the VPN server and another client device while the communication session is inactive.

17. The non-transitory computer readable storage medium of claim 15, wherein the message is a single packet comprising the previously used session information.

* * * * *